Oct. 7, 1952  A. K. SEEMANN  2,613,119
PIVOTED DEVICE
Filed Oct. 19, 1946

INVENTOR
ARTHUR K. SEEMANN
BY
ATTORNEY

Patented Oct. 7, 1952

2,613,119

UNITED STATES PATENT OFFICE 2,613,119

PIVOTED DEVICE

Arthur K. Seemann, Manhasset, N. Y., assignor, by mesne assignments, to Union Carbide and Carbon Corporation, a corporation of New York Application October 19, 1946, Serial No. 704,350

10 Claims. (Cl. 308—159)

This invention relates to pivoted devices and particularly to improved shafts and bearings for devices which turn in operation, such as compass needles, and the balance wheels and gears of timepieces and other instruments.

For many years it has been common to provide the better types of timepieces, compasses, and many measuring instruments with wear resistant jewel end bearings within which metal shafts or spindles turn. Such constructions are not completely satisfactory for use in some electrical clocks and instruments because the metal shafts are conductors of electricity and also often are magnetic. Furthermore, the ruby or sapphire bearings within which each shaft is journaled are relatively costly. Also, metal shafts or spindles have relatively low moduli of elasticity and may bend in operation.

A composite device consisting of a metal shaft having jewel pivots inserted in its ends has been suggested; but such devices are subject to the disadvantages discussed above, and additionally are relatively undependable because the jewel inserts may become loose in operation.

Among the objects of the present invention are: to provide in a pivoted device a unitary non-magnetic and electrically non-conductive shaft or spindle which is especially suitable for electrical timepieces and instruments; which provides low friction and good wear resistance relatively inexpensively; which has high resistance to bending; and which is dependable in operation. Another object is to provide a novel inexpensive yet wear resistant combination of a pivoted shaft journaled in end bearings. Still another object is to provide a strong, long-wearing self-lubricating shaft and bearing combination.

Figure 1:
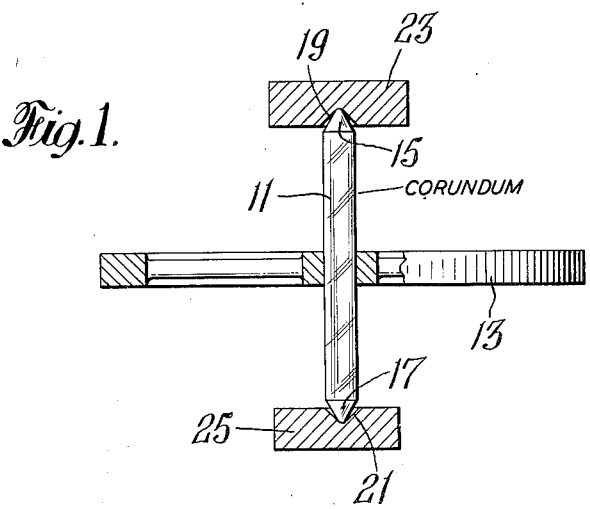
Figure 2:
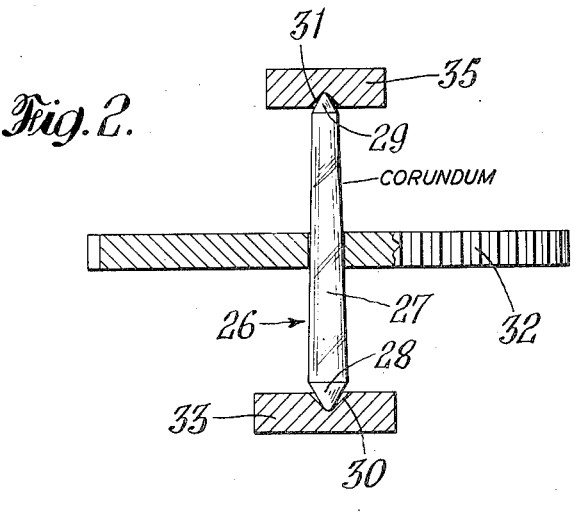

The above and other objects and the novel features of the invention will become apparent from the following description, having reference to the annexed drawing wherein:

Figs. 1 and 2 are enlarged side elevational views, partly broken away and in section, of two different types of pivoted devices embodying the principles of the invention.

In accordance with the invention there is provided a unitary unicrystalline corundum shaft or spindle carrying any desired turnable device such as a metallic compass needle, balance wheel, gear wheel, or other machine element. As shown in Fig. 1, a unitary cylindrical corundum shaft 11 has rigidly mounted thereon and secured thereto by a shrink fit a sleeve-like clock balance wheel 13 which oscillates about its axis with the shaft 11. Both ends of shaft 11 are conically tapered to form pivots 15 and 17 which are journaled in end bearings or recesses 19 and 21, respectively, formed in side plates 23 and 25. Some instruments may require that only one end of the shaft be conically tapered.

In another modification of the invention shown in Fig. 2 a unitary unicrystalline corundum shaft 26 has a main intermediate section 27 tapering gradually from a maximum at one end to a minimum at its other end, and conically tapered end pivots 28 and 29 adjoining the tapered section. The tapered section may terminate at the point where the gear wheel 32 is secured to the shaft. Pivots 28 and 29 are journaled in bearings or recesses 30 and 31 formed in plates 33 and 35. A gear wheel 32 is sleeved over and rigidly secured to tapered shaft 26 by a tapered driven friction fit for rotation therewith.

Although the end bearings 19, 21, 30, and 31 may be of any suitable construction, it has been found possible to decrease the cost of instrument manufacture by journaling the unitary corundum shafts 11 and 26 in simple recesses integrally machined, cast, or indented in the metal or other side pieces of an instrument. These recesses desirably are conically tapered to a greater degree than the tapered ends of the shafts so that only the extreme ends of the shafts will bear against the bottoms of the recesses. Lubricated metal end bearings can be used, but for some instruments such as watches, the aligned recesses advantageously are formed in plates of suitable self-lubricating material such as a plate of thermo-setting phenol formaldehyde resin impregnated with graphite or other oil-less lubricant. Such constructions provide low friction and long life, while permitting a low cost of manufacture.

Especially advantageous is the fact that a unicrystalline corundum shaft is a non-conductor of electricity and is not magnetic, so that it can be used in electrical timepieces and instruments without special insulation precautions.

Another important advantage of a unicrystalline corundum shaft or spindle is its superior rigidity or stiffness which prevents bending in operation. The modulus of elasticity for unicrystalline corundum is about $50 \times 10^6$ lbs./sq. in., whereas the moduli of elasticity for low carbon steel and high brass, respectively, are only $28 \times 10^6$ lbs./sq. in. and $15 \times 10^6$ lbs./sq. in. Furthermore, a unitary corundum shaft is dependable in operation compared with a composite shaft, in which the jewel inserts may loosen.

The unitary unicrystalline corundum shafts 11 and 26 advantageously are made by grinding them from long thin corundum rods which are grown as rods by a modification of the well-known Verneuil process, wherein powdered alumina is dropped through an oxy-hydrogen flame and gradually builds up a corundum rod on a suitable support. Such rods have been grown in a wide variety of diameters so that rods of approximately the desired diameter can be selected for the shafts of many devices such as timepieces, measuring instruments, and compasses. Shafts made from such corundum rods are characterized by the presence therein of the longitudinal axis along which the rod grew during its manufacture. It is also possible to machine the shafts from relatively large corundum half boules, but this is more costly than using corundum rods as grown. Shafts made from such half boules do not have therein a longitudinal axis of growth.

The surfaces of unitary unicrystalline corundum shafts or spindles can be finished by conventional abrading procedures, or by a recently developed flame-glossing process wherein a flame is applied to the corundum rod surface to remove all roughness. Likewise, the conical pivots at the ends of a corundum shaft can be ground to shape, and then polished and rounded slightly at the ends either by abrasively polishing them or by glossing and shaping them with a flame which is applied to the conical surface. Flame-glossing is more advantageous for finishing the pivots because it provides a smooth surface free from scratches, thus reducing friction.

Specific devices have been described above solely to illustrate the principles of the invention. It is to be understood that changes in the construction and in the relative arrangement of parts can be made by those skilled in the art within the scope of the invention, as defined by the appended claims.

I claim:

1. A unitary shaft of unicrystalline corundum having tapered pivots at the ends thereof provided with smooth, scratch-free, flame-glossed surfaces, and a machine element mounted on said shaft between said ends.

2. In combination, bearing means, a unitary shaft of unicrystalline corundum journaled in said bearing means, and a machine element mounted on said shaft between the ends thereof.

3. In combination, a pair of spaced metal supports having opposed recesses formed integrally therein, a unitary shaft of unicrystalline corundum having the ends thereof journaled in said recesses, and a machine element secured to said shaft between said ends.

4. In combination, a pair of spaced metal supports having opposed indentations formed integrally therein, a unitary shaft of unicrystalline corundum journaled at the ends in said indentations, and a machine element secured to said shaft between said ends.

5. In combination, a pair of spaced supports having opposed recesses therein, a unitary shaft of unicrystalline corundum having tapered pivots at the ends thereof journaled in said recesses, said pivots being provided with smooth, scratch-free, flame-glossed surfaces, and a machine element secured on said shaft between said ends.

6. In combination, a pair of spaced opposed self-lubricating bearings, and a unitary shaft of unicrystalline corundum journaled in said bearings.

7. A unitary shaft of unicrystalline corundum having the opposite ends thereof tapered to form pivots.

8. A unitary shaft of unicrystalline corundum having an intermediate section tapering gradually from a maximum at one end thereof to a minimum at the other end thereof, said shaft also having tapered pivots at opposite ends thereof.

9. In combination, self-lubricating bearing means, and a unitary shaft of unicrystalline corundum journalled in said bearing means.

10. In combination, self-lubricating bearing means, a unitary shaft of unicrystalline corundum journalled in said bearing means, and a machine element mounted on said shaft.

ARTHUR K. SEEMANN.

REFERENCES CITED

The following references are of record in the file of this patent:

UNITED STATES PATENTS

| Number | Name | Date |
|---|---|---|
| 352,935 | Schellenberger | Nov. 23, 1886 |
| 811,323 | Currier | Jan. 30, 1906 |
| 923,184 | Johnson | June 1, 1909 |
| 1,975,646 | Luthy | Oct. 2, 1934 |
| 2,094,960 | Putnam | Oct. 5, 1937 |
| 2,182,414 | Tarbell | Dec. 5, 1939 |
| 2,412,925 | Stupakoff | Dec. 17, 1946 |
| 2,482,205 | Potts | Sept. 20, 1949 |

FOREIGN PATENTS

| Number | Country | Date |
|---|---|---|
| 156,168 | Switzerland | July 31, 1932 |

OTHER REFERENCES

Product Engineering, October 1943, pages 668 to 670. (Copy in Division 45.)